(12) United States Patent
Li et al.

(10) Patent No.: US 11,952,288 B2
(45) Date of Patent: Apr. 9, 2024

(54) METHOD FOR PRODUCING BATTERY-GRADE NICKEL SULFATE BY USING LATERITE NICKEL ORE

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP VEHICLES RECYCLING CO., LTD., Changsha (CN); NINGDE BRUNP RECYCLING TECHNOLOGY CO., LTD., Ningde (CN)

(72) Inventors: Changdong Li, Foshan (CN); Honghui Tang, Foshan (CN); Chunyi Wang, Foshan (CN); Xinan Pei, Foshan (CN); Xingdui Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP VEHICLES RECYCLING CO., LTD., Changsha (CN); NINGDE BRUNP RECYCLING TECHNOLOGY CO., LTD., Ningde (CN)

(*) Notice: Subject to any disclaimer, the term of this patent is extended or adjusted under 35 U.S.C. 154(b) by 0 days.

(21) Appl. No.: 18/042,207
(22) PCT Filed: Aug. 3, 2021
(86) PCT No.: PCT/CN2021/110292
§ 371 (c)(1),
(2) Date: Feb. 17, 2023
(87) PCT Pub. No.: WO2022/037404
PCT Pub. Date: Feb. 24, 2022

(65) Prior Publication Data
US 2023/0227326 A1 Jul. 20, 2023

(30) Foreign Application Priority Data
Aug. 17, 2020 (CN) .......................... 202010825181.7

(51) Int. Cl.
*C01G 53/10* (2006.01)
*C22B 1/06* (2006.01)
(Continued)

(52) U.S. Cl.
CPC ................. *C01G 53/10* (2013.01); *C22B 1/06* (2013.01); *C22B 3/08* (2013.01); *C22B 3/3842* (2021.05);
(Continued)

(58) Field of Classification Search
CPC ...... C22B 23/005; C01G 53/10; C01G 53/003
See application file for complete search history.

(56) References Cited

U.S. PATENT DOCUMENTS

2007/0034056 A1* 2/2007 Miller .................. C22B 23/043
75/743
2017/0175227 A1* 6/2017 Ohara ....................... C22B 3/08

FOREIGN PATENT DOCUMENTS

CN 101073790 A 11/2007
CN 101285128 A 10/2008
(Continued)

OTHER PUBLICATIONS

CN 102226232 A machine translation, translated Sep. 6, 2022, originally published Oct. 26, 2011 (Year: 2011).*
(Continued)

*Primary Examiner* — Vanessa T. Luk
*Assistant Examiner* — Nikolas Takuya Pullen
(74) *Attorney, Agent, or Firm* — Buchalter; Jason W. Croft

(57) ABSTRACT

Disclosed is a method for producing battery-grade nickel sulfate by using laterite nickel ore comprising the following steps: sorting the laterite nickel ore to obtain lump ore and sediment ore; crushing the lump ore, and then performing heap leaching, to obtain a crude nickel sulfate solution A; separating the sediment ore to obtain high chromium ore,
(Continued)

low iron, high magnesium ore, and high iron, low magnesium ore, and drying, roasting, reducing, and sulfurating the low iron, high magnesium ore to obtain low nickel matte; blowing and performing water extraction on the low nickel matte, and then performing oxygen pressure leaching, to obtain a crude nickel sulfate solution B; performing pressure leaching on the high iron, low magnesium ore to obtain a crude nickel sulfate solution C; and performing extraction on the crude nickel sulfate solutions A, B, and C, and then evaporating and crystallizing, to obtain battery-grade nickel sulfate.

8 Claims, 1 Drawing Sheet

(51) Int. Cl.
*C22B 3/00* (2006.01)
*C22B 3/08* (2006.01)
*C22B 3/38* (2006.01)
*C22B 23/00* (2006.01)
*C22B 23/02* (2006.01)

(52) U.S. Cl.
CPC .......... *C22B 3/3844* (2021.05); *C22B 3/3846* (2021.05); *C22B 23/005* (2013.01); *C22B 23/02* (2013.01); *C22B 23/025* (2013.01); *C22B 23/043* (2013.01); *C22B 23/0453* (2013.01)

(56) References Cited

FOREIGN PATENT DOCUMENTS

| | | | |
|---|---|---|---|
| CN | 101289704 A | 10/2008 | |
| CN | 101555556 A | 10/2009 | |
| CN | 101603141 A | 12/2009 | |
| CN | 102154545 A | 8/2011 | |
| CN | 102191377 A | 9/2011 | |
| CN | 102226232 A | 10/2011 | |
| CN | 103555930 A | 2/2014 | |
| CN | 104630501 A | 5/2015 | |
| CN | 104959219 A | 10/2015 | |
| CN | 106636625 A | 5/2017 | |
| CN | 108165733 A | 6/2018 | |
| CN | 109234526 A | 1/2019 | |
| CN | 112080636 A | 12/2020 | |
| CN | 112080636 B | 11/2022 | |
| EP | 1954843 B1 * | 1/2013 | ................ C01F 5/40 |
| GB | 1467020 A | 3/1977 | |
| KR | 101191042 B1 * | 10/2012 | ............. C01G 53/10 |
| WO | 01/32944 A1 | 5/2001 | |
| WO | 2005005671 A1 | 1/2005 | |
| WO | 2006119559 A1 | 11/2006 | |
| WO | 2022037404 A1 | 2/2022 | |

OTHER PUBLICATIONS

First Office Action and Search Report in Chinese Application No. 202010825181.7 dated Nov. 15, 2021.
Second Office Action in Chinese Application No. 202010825181.7 dated May 18, 2022.
Supplementary Search Report in Chinese Application No. 202010825181.7 dated Sep. 7, 2022.
Notification to Grant Patent Right for Invention in Chinese Application No. 202010825181.7 dated Sep. 15, 2022.
International Search Report and Written Opinion in PCT/CN2021/110292 dated Oct. 22, 2021.

* cited by examiner

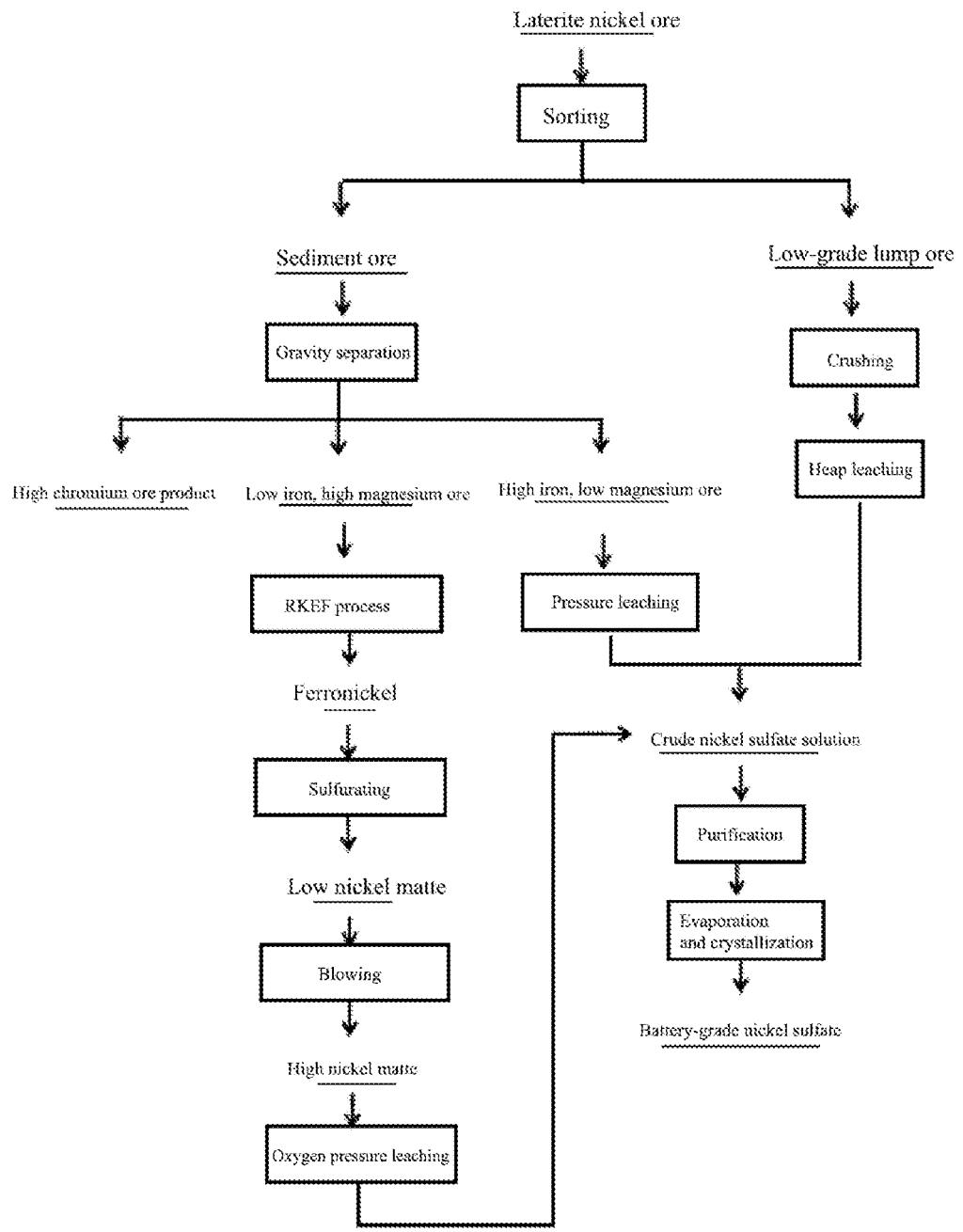

METHOD FOR PRODUCING BATTERY-GRADE NICKEL SULFATE BY USING LATERITE NICKEL ORE

CROSS-REFERENCE TO RELATED APPLICATION

The present application is a national phase entry under 35 USC § 371 of International Application PCT/CN2021/110292, filed Aug. 3, 2021, which claims the benefit of and priority to Chinese Patent Application No. 202010825181.7, filed Aug. 17, 2020, the entire disclosures of which are incorporated herein by reference.

TECHNICAL FIELD

The present disclosure relates to the field of non-ferrous metal metallurgy, and specifically, to a method for producing battery-grade nickel sulfate by using laterite nickel ore.

BACKGROUND

Laterite ore is nickel oxide ore formed by metamorphosing nickel-containing peridotite in tropical or subtropical areas through large-scale, long-term weathering and eluviation. Due to differences in geographic locations, climatic conditions, and weathering degrees, types of laterite ore around the world are not completely the same. In a weathering process, layered deposits are generally produced, and the complete or most thorough weathering products near the crust, as the depth increases, becomes less weathering products gradually, and finally, at a deeper place, becomes unweathered rocks. In a highly weathered layer, usually, most of contained nickel is finely distributed in finely divided goethite particles, and the highly weathered layer is usually referred to as limonite generally containing a high proportion of iron and a low proportion of silicon and magnesium. Nickel contained in a lightly weathered layer is generally more likely to be contained in various magnesium silicate minerals such as serpentine. There may be many other nickel-containing silicate minerals in a zone of incomplete weathering. A partially weathered zone having a high magnesium content is usually referred to as saprolite or garnierite which generally contains a low proportion of iron and a high proportion of silicon and magnesium. In some deposits, there is another zone that mainly contains nontronite clay and that is usually located between limonite and saprolite, which is referred to as transitional ore. "Low-grade laterite ore" refers to laterite ore without saprolite ore, that is, laterite ore consisting of limonite and transitional ore. Generally, limonite is a main component of laterite nickel ore, and accounts for 65-75% of a total amount of the laterite ore, saprolite accounts for 15-25%, and transitional ore accounts for 10%. The difficulty in recovering nickel and cobalt from laterite nickel ore is that before chemical treatment is carried out to separate useful metal components (such as nickel and cobalt), the useful components of nickel cannot usually be fully concentrated in physical manners, that is, cannot be concentrated by using an ore dressing technology, resulting in very high costs of treatment on laterite nickel ore. In addition, due to the different minerals and chemical composition of limonite and saprolite, the ores are usually not suitable for being treated by using the same treatment technology. For decades, a method for lowering costs of treatment on laterite nickel ore has been looked for.

Well-known metallurgical methods for treating laterite nickel ore include a pyrometallurgical process, a hydrometallurgical process, and a pyro-hydrometallurgical process.

1. Pyrometallurgical Process

It is a metallurgical method in which carbonaceous material such as coke or semi-coke are reduced or sulfurated in a metallurgical furnace to produce ferronickel or nickel matte. The pyrometallurgical process includes technical solutions such as smelting ferronickel by using a rotary kiln-electric furnace (RKEF), smelting ferronickel by using a sintering machine-blast furnace, smelting ferronickel by using a ball press machine-blast furnace, smelting low nickel matte by using a spherical agglomerate-blast furnace, and smelting low nickel matte by using an RKFF.

The pyrometallurgical process is suitable for treating saprolite laterite nickel ore of a high silicon and magnesium, low iron saprolite. Only ferronickel and nickel matte can be produced through the process, and cobalt cannot be recovered, which limits application of the pyrometallurgical process. Moreover, during the pyrometallurgical process, a content of iron in ore needs to be controlled, to obtain high-grade ferronickel. Although the blast furnace can treat high iron ore, a product of low nickel pig iron with poor quality is generally obtain. A specific proportion of iron to nickel needs to be controlled to obtain high-grade ferronickel. For meeting the requirements of pyrometallurgical slagging, a ratio of silicon to magnesium of the ore also needs to be controlled within an appropriate range, and a content of aluminum oxide cannot be too high, which limits a use range of the pyrometallurgical process.

2. Hydrometallurgical Process

In the hydrometallurgical process, valuable metals, such as nickel and cobalt, are leached from laterite nickel ore generally by using leaching agents such as sulfuric acid and hydrochloric acid, and then, a nickel sulfate or electrolytic nickel product is obtained by using methods such as purification and electrolysis. The hydrometallurgical process is suitable for treating limonite.

The hydrometallurgical technology includes processes such as high-pressure acid leaching and reduction roasting-ammonia leaching, as well as atmospheric pressure acid leaching and heap leaching that have emerged in recent years. The heap leaching technology has a low leaching rate and is only suitable for treating laterite ore having a high magnesium content. The reduction roasting-ammonia leaching process is rarely used due to high energy consumption and a long process procedure. The atmospheric pressure acid leaching technology is simple in terms of operation, and does not require expensive autoclaves. However, in the atmospheric pressure acid leaching, a large amount of acid needs to be consumed for completely dissolving minerals, so low magnesium, low iron nickel ore is generally selected to reduce acid consumption. In addition, the atmospheric pressure acid leaching has a disadvantage that a leachate contains various metal ions, resulting in more complex subsequent leaching and separation procedures. In the high-pressure acid leaching process, laterite nickel ore is leached by using sulfuric acid at a high temperature and a high pressure. Under the high temperature and high pressure, metal minerals in the ore are almost completely dissolved. Dissolved iron is rapidly hydrolyzed into a hematite precipitate at the high temperature, and nickel, cobalt, and the like remain in the solution. After cooling, leaching residue containing iron and silicon is separated from the solution containing nickel and cobalt through a series of concentration and washing, that is, the so-called counter-current decantation washing circuit. Therefore, a main objective of the leaching process, separation of nickel and iron, is achieved. Advantages of the high-pressure acid leaching process are that leaching rates of nickel and cobalt are high, a reaction speed is high, a reaction time is short, iron does not consume sulfuric acid in the acid leaching process theoretically, and a hydrolysis product is a hematite precipitate. However, disadvantages of the high-pressure acid leaching process are also obvious, which requires complex high-temperature and high-pressure autoclaves and related equipment whose installation and maintenance are expensive. The high-pressure leaching process is limited to the treatment of raw materials, such as limonite, because saprolite ore contains a high content of magnesium that causes a large increase in consumption of sulfuric acid.

3. Pyro-Hydrometallurgical Process

At present, the only plant that treats nickel oxide by using a pyro-hydrometallurgical process in the world is Oheyama Smelter of the Nippon Yakin Company. A main process comprises that raw ore is ground and mixed with powdered coal to form agglomerate ore, the agglomerate ore is dried and subjected to high-temperature reduction roasting, the roasted agglomerate ore is reground, and pulp is subjected to gravity separation and magnetic separation, to obtain a nickel-iron alloy product. The biggest characteristic of the process is that energy in energy consumption is provided by coal, and as a result production costs are low. However, energy consumed by electric furnace smelting in the pyrometallurgical process is provided by electric energy. There is a big price difference in terms of energy consumption costs between the two. There are still many problems in the pyro-hydrometallurgical process. Although Oheyama Smelter has been improved the process many times, technologies in the process are still not stable enough. After decades, the production scale of Oheyama Smelter has remained at about 10000 tons of nickel per year.

Wang Yunhua et al. provided a technical solution of reduction-grinding treatment for different types of laterite nickel ore in a Chinese Patent (Application No. 200610163831.6). The application of Wang Yunhua et al. relates to a technology for recovering nickel from laterite nickel ore, which comprises that: the laterite nickel ore is crushed and ground; a carbonaceous reducing agent and a compound additive are added to the crushed and ground laterite nickel ore at a specific ratio and mixed with the laterite nickel ore for grinding; the grinded mixtures are formed into spherical agglomerates of 15-20 mm by using a spherical agglomerate forming machine, dried at 200-400° C. for 4-6 hours, and is subjected to reduction roasting in a rotary kiln whose temperature is controlled at 950-1300° C.; after the reduction roasting, the roasted spherical agglomerates are subjected to coarse crushing, wet ball milling according to a specific ratio of pulp, gravity separation by using a shaking table to obtain nickel concentrates; and the obtained nickel concentrates are sorted by using a 3000-5000 gauss magnetic separator to obtain high-grade nickel-iron mixed concentrates with a nickel content of 7-15%. The technical solution has the characteristics of strong raw material adaptability, a short process procedure, environmental friendliness, and using coal as a main energy source instead of using expensive electricity as an energy source, which provides a novel method for processing different types of laterite nickel ore, and has good application and promotion prospects. However, the solution has the following problems that need to be alleviated in subsequent applications: (1) Due to fluctuations of components in the laterite nickel ore, the rotary kiln has the serious ring formation problem during a roasting process. (2) Since the entire reduction process is carried out under melting conditions, nickel is distributed in silicate lattices and is relatively dispersed. The metallurgical kinetic conditions do not allow partially reduced nickel to be effectively migrated, concentrated, and recovered, and a recovery rate of nickel is extremely low. (3) The nickel grade of concentrates is limited by a content of iron content in the nickel ore. When the content of iron is high, the nickel grade is low. When the content of iron is low, the dose of iron as a trapping agent is small, and the recovery rate of nickel is low.

Treating laterite nickel ore by using a combined method of an RKEF and atmospheric-pressure leaching has also been put forward. However, because limonite cannot be treated with the atmospheric-pressure leaching, only low iron, low magnesium transition-layer ore can be selected, which is difficult to match. In addition, the atmospheric-pressure leaching cannot be effectively implemented due to the problems of high acid consumption, a low nickel recovery rate, a large amount of smelting wastewater that is difficult to treat, and high smelting costs.

Although nickel ore with different properties is distributed in layers, there is no obvious boundary between the layers. With the undulation of terrain, it is difficult to separate the nickel ore having a specific property from others during mining, resulting to mixing of nickel ore having different properties, which also brings a challenge to stability of the treatment process.

SUMMARY

An objective of the present disclosure is to provide a method for producing battery-grade nickel sulfate by using laterite nickel ore, to obtain a battery-grade nickel sulfate product. In the process, advantages of technical solutions, namely, pyrometallurgy, hydrometallurgy, and heap leaching, are fully utilized, and the technical solutions are integrated together to complement each other, leading to advantages of low production costs, environmentally friendliness, high in recovery rates of nickel and cobalt, effective utilization of nickel ore resources, and broad application and promotion prospects.

To achieve the foregoing objective, the present disclosure uses the following technical solutions:

A method for producing battery-grade nickel sulfate by using laterite nickel ore is provided, including the following steps:

(1) sorting the laterite nickel ore to obtain lump ore and sediment ore;

(2) crushing the lump ore, and then performing heap leaching, to obtain a crude nickel sulfate solution A;

(3) separating the sediment ore to obtain high chromium ore, low iron, high magnesium ore, and high iron, low magnesium ore, and drying, roasting, reducing, and sulfurating the low iron, high magnesium ore to obtain low nickel matte;

(4) blowing and performing water extraction on the low nickel matte, and then performing oxygen pressure leaching, to obtain a crude nickel sulfate solution B;

(5) performing pressure leaching on the high iron, low magnesium ore to obtain a crude nickel sulfate solution C; and (6) performing extraction on the crude nickel sulfate solution A, the crude nickel sulfate solution B, and the crude nickel sulfate solution C, and then evaporating and crystallizing, to obtain battery-grade nickel sulfate.

Preferably, in step (6), the battery-grade nickel sulfate differs from electroplating-grade nickel sulfate in that in battery-grade nickel sulfate, requirements on contents of magnetic substances, cobalt, magnesium, and silicon, are relatively high, where a content of Mg<0.002%, a content of Si<0.001%, a content of magnetic substance<0.08%, and a content of Co<0.002%.

Preferably, in step (1), the laterite nickel ore mainly includes the following components by mass percentage: 1.2-2% of Ni, 15-40% of Fe, 6-20% of Mg, 0.03-0.25% of Co, and 10-40% of Si.

Preferably, in step (1), the lump ore and the sediment ore are sorted according to a particle size, where a particle size of the lump ore is greater than 10 mm, and a particle size of the sediment ore is less than 10 mm.

Preferably, in step (2), during the crushing, the lump ore is crushed to 1-8 mm.

Preferably, in step (2), for the heap leaching, a temperature is 40-60° C., and a time is 30-50 days.

Preferably, in step (2), a specific operation of the heap leaching comprises: putting the crushed lump ore into a heap leaching pool, and then leaching nickel from the ore in a manner of spraying and soaking in sulfuric acid, to obtain the crude nickel sulfate solution.

More preferably, a mass concentration of the dilute sulfuric acid is 1-5%.

Preferably, in step (3), in the sorting, high chromium ore, low iron, high magnesium ore, and high iron, low magnesium ore are separated by using a gravity separation method such as a trough ore washer, a spiral chute, or a shaking table. The high chromium ore may be sold directly as a finished product.

Preferably, in step (3), the high chromium ore comprises 30-40% of chromium and 0.1-0.2% of nickel; the low iron, high magnesium ore is mainly garnierite and comprises 1.5-2.1% of nickel, 15-25% of magnesium, 8-25% of iron, and 35-50% of silicon; and the high iron, low magnesium ore is mainly limonite and comprises 0.8-1.3% of nickel, 30-50% of iron, 0.1-10% of magnesium, and 10-30% of silicon. The low iron, high magnesium ore and the high iron, low magnesium ore are different in granularity and property.

Preferably, in step (3), during the drying, the low iron, high magnesium ore is dried to a water content of 17-24%.

Preferably, in step (3), for the roasting, a temperature is 800-1000° C., and a time is 1-3 h.

Preferably, in step (3), for the reducing, a temperature is 1400-1600° C., and a time is 2-4 h.

Preferably, in step (3), a reducing agent used for the reducing is at least one of coke, semi-coke, or anthracite.

By reducing an addition amount of the reducing agent, that is, the addition amount of the reducing agent is 1-5% of dry ore, a nickel content of ferronickel is controlled, and as a result a grade of ferronickel reaches 20-35%, thereby reducing an iron content of ferronickel and reducing costs of sulfurating and blowing.

Preferably, in step (3), for the sulfurating, a temperature is 1100-1400° C., and a time is 0.5-3 h.

Preferably, in step (3), a nickel content of the low nickel matte is 15-30%. Relatively, nickel-sulfur-iron compounds containing more than 50% nickel are referred to as high nickel matte, and nickel-sulfur-iron compounds containing less than 50% of nickel are referred to as low nickel matte.

Preferably, in step (4), the pressure of the water extraction is 1-5 MPa.

Preferably, in step (4), for the oxygen pressure leaching, a temperature is 100-250° C., and a pressure is 1-5 MPa.

Preferably, in step (5), for the pressure leaching, a temperature is 170-260° C., and a pressure is 1-5 MPa.

Preferably, in step (6), an acidic extractant is used in the extraction, during which $Fe^{2+}$, $Mn^{2+}$, $Co^{2+}$, $Mg^{2+}$, and $Ca^{2+}$ are extracted to obtain a nickel sulfate solution, and the acidic extractant is at least one of P204 (diisooctyl phosphate), P507 (mono2-ethylhexyl 2-ethylhexyl phosphate), or C272 (di(2,4,4-trimethylpentyl)).

More preferably, in step (6), a specific operation of the extraction comprises: under conditions of a temperature of 50-80° C. and a pH value of 2-5, first extracting $Fe^{3+}$ and $Mn^{2+}$ by using P204, and then extracting $Co^{2+}$, $Mg^{2+}$, and $Ca^{2+}$ by using either or both of P507 (mono2-ethylhexyl 2-ethylhexyl phosphate) and C272 (di(2,4,4-trimethylpentyl)), to obtain the nickel sulfate solution.

The present disclosure further provides use of the foregoing method in separation and purification of nickel ore.

At present, selection of a granularity parameter is very important during ore dressing. Performance of ore after ore dressing is further considered for the ore dressing. Otherwise, the high iron, low magnesium ore and the low iron, high magnesium ore cannot be separated. Consequently, advantages of various processes cannot be brought into play. An appropriate granularity dividing point not only requires a large quantity of experimental demonstrations, but requires that experiments are carried out again to explore parameters based on experience of inventors and improvement to processes due to different weathering degrees of ore in mines Therefore, the granularity dividing point is not an absolute fixed value. In the present disclosure, the high iron, low magnesium ore and the low iron, high magnesium ore are first separated, and then the laterite nickel ore is treated by using the combined method of the RKEF process, the pressure leaching process, and the heap leaching process, and as a result the high iron, low magnesium ore and the low iron, high magnesium ore as well as large stone ore having a relatively low grade (generally, low-grade large stone ore is abandoned in mines) can be treated simultaneously. Different ores are treated with appropriate processes by utilizing characteristics of the ores, and as a result advantages of pyrometallurgical and hydrometallurgical processes are brought into full play and the pyrometallurgical and hydrometallurgical processes complement each other. Not only costs of treatment on ore are lowered, but also various ore resources are effectively utilized, to reduce wastewater discharge for resource saving and environmental protection.

Beneficial Effects

1. In the present disclosure, advantages of three technologies, that is, an RKEF process, a pressure leaching process, and a heap leaching process are fully utilized, and the three technologies are integrated together to complement each other, such that characteristics of different ores are utilized, and appropriate processes are used, and as a result production costs are low, and a comprehensive recovery rate of nickel and cobalt reaches more than 90%.

2. The pressure leaching process is used for low magnesium ore, leading to low acid consumption, a small amount of magnesium-containing wastewater, and environmental friendliness. The large stone ore is crushed to 1-10 mm, results in a good uniform permeability of particles of the large stone ore, which can avoid problems such as permeation and segregation. During the heap leaching, nickel is easy to leach, a leaching rate of magnesium is low, slag can be comprehensively utilized, and smelting costs are low. High magnesium ore is treated by using an RKEF, to avoid problems, such as high acid consumption and a large amount of magnesium-containing wastewater, caused by the reaction between magnesium and acid in the hydrometallurgical treatment.

3. In RKEF smelting, high-nickel and iron containing more than 20% of nickel is selected, and as a result part of iron can be discharged during the RKEF procedure, to reduce costs for subsequent nickel-iron sulfurating in a PS rotary furnace and low nickel matte blowing.

4. Slag in the RKEF process can be used as river sand for concrete pouring and manufacturing of cement bricks. Heap leaching slag can be used for manufacturing of cement foam bricks. The technology has low smelting costs, is energy-saving and environmentally friendly, and has good comprehensive economic benefits. If any single method is used to treat various ores, an increase in smelting costs and poor economic benefits may be caused.

BRIEF DESCRIPTION OF DRAWINGS

FIG. 1 is a schematic diagram of a process flow of producing battery-grade nickel sulfate by using laterite nickel ore according to Example 1.

DETAILED DESCRIPTION

To make a person skilled in the art understand the technical solutions of the present disclosure more clearly, the following examples are listed for description. It should be noted that the following examples do not limit the protection scope of the present disclosure.

Unless otherwise specified, the raw materials, reagents, or devices used in the following examples can be commercially available, or can be obtained by existing known methods.

Example 1

A method for producing battery-grade nickel sulfate by using laterite nickel ore was provided, including the following steps:

(1) The laterite nickel ore mainly containing 1.75% of Ni, 18% of Fe, 15% of Mg, 0.03% of Co, and 30% of Si was crushed by a jaw crusher, and then an impact crusher matching with a vibrating screen, to obtain lump ore having a particle size of greater than 10 mm and sediment ore having a particle size of less than 10 mm.

(2) The lump ore was crushed to 1-8 mm, piled into a heap leaching pool to be sprayed with a dilute sulfuric acid aqueous solution having a mass concentration of 2%, and leached at a temperature of 50° C. for 40 days, to obtain a crude nickel sulfate solution A.

(3) The sediment ore was separated to obtain high chromium ore, low iron, high magnesium ore of 0.15-1 mm, and high iron, low magnesium ore of 0.045-0.15 mm, and the low iron, high magnesium ore was dried to a water content of 20-24%, first roasted at 900° C., then reduced (coke and semi coke were added for reduction) at 1500° C., and finally sulfurated at 1200° C. for 1.5 h, to obtain low nickel matte having a nickel content of 18%.

(4) The low nickel matte was blown into high nickel matte having a nickel content of 70%, the high nickel matte was subjected to water-extraction to obtain nickel beans, and then the nickel beans was subjected to oxygen pressure leaching at 150° C. and 2.5 MPa, to obtain a crude nickel sulfate solution B.

(5) The high iron, low magnesium ore was subjected to high pressure leaching at 200° C. and 2.5 MPa, to obtain a crude nickel sulfate solution C.

(6) Under conditions of a temperature of 60° C. and a pH value of 4, from the crude nickel sulfate solution A, the crude nickel sulfate solution B, and the crude nickel sulfate solution C, $Fe^{3+}$ and $Mn^{2+}$ were extracted by using P204 (diisooctyl phosphate), and then $Co^{2+}$, $Mg^{2+}$, and $Ca^{2+}$ were extracted by using P507 (mono2-ethylhexyl 2-ethylhexyl phosphate) and C272 (di(2,4,4-trimethylpentyl)), to obtain a pure nickel sulfate solution, and then the nickel sulfate solution was evaporated and crystallized to obtain battery-grade nickel sulfate.

Contents of impurities in the nickel sulfate product in Example 1 were: cobalt (Co)=0.0003%, iron (Fe)=0.0002%, magnesium (Mg)=0.0001%, manganese (Mn)=0.0001%, and zinc (Zn)=0.0002%. A comprehensive recovery rate of nickel ore was 92% (nickel recovery rate=nickel content of product/nickel content of ore*100%), and smelting costs of nickel sulfate were 10000 US dollars/ton base nickel.

Example 2

A method for producing battery-grade nickel sulfate by using laterite nickel ore was provided, including the following steps:

(1) The laterite nickel ore mainly containing 1.2% of Ni, 40% of Fe, 6% of Mg, 0.2% of Co, and 25% of Si was crushed by a jaw crusher, and then an impact crusher matching with a vibrating screen, to obtain lump ore having a particle size of greater than 10 mm and sediment ore having a particle size of less than 10 mm.

(2) The lump ore was crushed to 1-8 mm, piled into a heap leaching pool to be sprayed with a dilute sulfuric acid aqueous solution having a mass concentration of 2%, and leached at a temperature of 50° C. for 40 days, to obtain a crude nickel sulfate solution A.

(3) The sediment ore was separated to obtain high chromium ore, low iron, high magnesium ore of 0.15-1 mm, and high iron, low magnesium ore of 0.045-0.15 mm, and the low iron, high magnesium ore was dried to a water content of 20-24%, first roasted at 900° C., then reduced at 1500° C., and finally sulfurated at 1200° C. for 1.5 h, to obtain low nickel matte having a nickel content of 15%.

(4) The low nickel matte was blown and subjected to water extraction, and then subjected to oxygen pressure leaching at 150° C. and 2.5 MPa, to obtain a crude nickel sulfate solution B.

(5) The high iron, low magnesium ore was subjected to high pressure leaching at 200° C. and 2.5 MPa, to obtain a crude nickel sulfate solution C.

(6) Under conditions of a temperature of 60° C. and a pH value of 4, from the crude nickel sulfate solution A, the crude nickel sulfate solution B, and the crude nickel sulfate solution C, $Fe^{3+}$ and $Mn^{3+}$ were extracted by using P204 (diisooctyl phosphate), and then $Co^{2+}$, $Mg^{2+}$, and $Ca^{3+}$ were extracted by using P507 (mono2-ethylhexyl 2-ethylhexyl phosphate) and C272 (di(2,4,4-trimethylpentyl)), to obtain a pure nickel sulfate solution, and then the nickel sulfate solution was evaporated and crystallized to obtain battery-grade nickel sulfate.

Contents of impurities in the nickel sulfate product in Example 2 were: cobalt (Co)=0.0005%, iron (Fe)=0.0006%, magnesium (Mg)=0.0001%, manganese (Mn)=0.0002%, and zinc (Zn)=0.0002%. A comprehensive recovery rate of nickel ore was 94%, and smelting costs of nickel sulfate were 10500 US dollars/ton base nickel.

Example 3

A method for producing battery-grade nickel sulfate by using laterite nickel ore was provided, including the following steps:

(1) The laterite nickel ore mainly containing 2.0% of Ni, 18% of Fe, 15% of Mg, 0.05% of Co, and 35% of Si was crushed by a jaw crusher, and then an impact crusher matching with a vibrating screen, to obtain lump ore having a particle size of greater than 10 mm and sediment ore having a particle size of less than 10 mm.

(2) The lump ore was crushed to 1-8 mm, piled into a heap leaching pool to be sprayed with a dilute sulfuric acid aqueous solution having a mass concentration of 2%, and leached at a temperature of 50° C. for 40 days, to obtain a crude nickel sulfate solution A.

(3) The sediment ore was separated to obtain high chromium ore, low iron, high magnesium ore of 0.15-1 mm, and high iron, low magnesium ore of 0.045-0.15 mm, and the low iron, high magnesium ore was dried to a water content of 20-24%, first roasted at 900° C., then reduced at 1500° C., and finally sulfurated at 1200° C. for 1.5 h, to obtain low nickel matte having a nickel content of 28%.

(4) The low nickel matte was blown and subjected to water extraction, and then subjected to oxygen pressure leaching at 150° C. and 2.5 MPa, to obtain a crude nickel sulfate solution B.

(5) The high iron, low magnesium ore was subjected to high pressure leaching at 200° C. and 2.5 MPa, to obtain a crude nickel sulfate solution C.

(6) Under conditions of a temperature of 60° C. and a pH value of 4, from the crude nickel sulfate solution A, the crude nickel sulfate solution B, and the crude nickel sulfate solution C, $Fe^{3+}$ and $Mn^{2+}$ were extracted by using P204 (diisooctyl phosphate), and then $Co^{2+}$, $Mg^{2+}$, and $Ca^{3+}$ were extracted by using P507 (mono2-ethylhexyl 2-ethylhexyl phosphate) and C272 (di(2,4,4-trimethylpentyl)), to obtain a pure nickel sulfate solution, and then the nickel sulfate solution was evaporated and crystallized to obtain battery-grade nickel sulfate.

Contents of impurities in the nickel sulfate product in Example 3 were: cobalt (Co)=0.0003%, iron (Fe)=0.0004%, magnesium (Mg)=0.0006%, manganese (Mn)=0.0002%, and zinc (Zn)=0.0001%. A comprehensive recovery rate of nickel ore was 94%, and smelting costs of nickel sulfate were 9850 US dollars/ton base nickel.

Comparative Example 1

A method for producing battery-grade nickel sulfate by using laterite nickel ore was provided, including the following steps:

(1) The laterite nickel ore mainly containing 1.75% of Ni, 18% of Fe, 15% of Mg, 0.03% of Co, and 30% of Si was crushed by a jaw crusher, and then an impact crusher matching with a vibrating screen, to obtain lump ore of greater than 10 mm and sediment ore of less than 10 mm.

(2) The lump ore was crushed, piled into a heap leaching pool to be sprayed with a dilute sulfuric acid aqueous solution having a mass concentration of 2%, and leached at a temperature of 50° C. for 40 days, to obtain a crude nickel sulfate solution.

(3) The sediment ore was subjected to oxygen pressure leaching at 150° C. and 2.5 MPa, to obtain a crude nickel sulfate solution.

(4) Under conditions of a temperature of 60° C. and a pH value of 4, from the crude nickel sulfate solutions in steps (2) and (3), $Fe^{3+}$ and $Mn^{3+}$ were extracted by using P204 (diisooctyl phosphate), and then $Co^{2+}$, $Mg^{2+}$, and $Ca^{3+}$ were extracted by using P507 (mono2-ethylhexyl 2-ethylhexyl phosphate) and C272 (di(2,4,4-trimethylpentyl)), to obtain a pure nickel sulfate solution, and then the nickel sulfate solution was evaporated and crystallized to obtain battery-grade nickel sulfate.

Contents of impurities in the nickel sulfate product in Comparative example 1 were: cobalt (Co)=0.0003%, iron (Fe)=0.0004%, magnesium (Mg)=0.0006%, manganese (Mn)=0.0002%, and zinc (Zn)=0.0001%. A comprehensive recovery rate of nickel ore was 90%, and smelting costs of nickel sulfate were 12500 US dollars/ton base nickel.

Example 1 differed from Comparative Example 1 in that, in Comparative Example 1, low iron, high magnesium ore of 0.15-1 mm was not separated from the sediment ore, and all the sediment ore was treated with pressure leaching. Consequently, a large amount of magnesium reacted with acid, and the acid consumption may reach 70 t/t-Ni. The smelting wastewater contained a large amount of Mg ions, resulting in high costs of treatment on wastewater and environmental pollution.

Comparative Example 2

A method for producing battery-grade nickel sulfate by using laterite nickel ore was provided, including the following steps:

(1) The laterite nickel ore mainly containing 1.2% of Ni, 40% of Fe, 6% of Mg, 0.2% of Co, and 25% of Si was crushed by a jaw crusher, and then an impact crusher matching with a vibrating screen, to obtain lump ore of greater than 10 mm and sediment ore of less than 10 mm.

(2) The lump ore was crushed, piled into a heap leaching pool to be sprayed with a dilute sulfuric acid aqueous solution having a mass concentration of 2%, and leached at a temperature of 50° C. for 40 days, to obtain a crude nickel sulfate solution.

(3) The sediment ore was dried to a water content of 20-24%, first roasted at 900° C., then reduced at 1500° C., and finally sulfurated at 1200° C. for 1.5 h, to obtain low nickel matte having a nickel content of 10%.

(4) The low nickel matte was blown and subjected to water extraction, and then was subjected to oxygen pressure leaching at 150° C. and 2.5 MPa, to obtain a crude nickel sulfate solution.

(5) Under conditions of a temperature of 60° C. and a pH value of 4, from the crude nickel sulfate solutions in steps (2) and (4), $Fe^{3+}$ and $Mn^{3+}$ were extracted by using P204 (diisooctyl phosphate), and then $Co^{2+}$, $Mg^{2+}$, and $Ca^{3+}$ were extracted by using P507 (mono2-ethylhexyl 2-ethylhexyl phosphate) and C272 (di(2,4,4-trimethylpentyl)), to obtain a pure nickel sulfate solution, and then the nickel sulfate solution was evaporated and crystallized to obtain battery-grade nickel sulfate.

Contents of impurities in the nickel sulfate product in Comparative example 2 were: cobalt (Co)=0.0005%, iron (Fe)=0.0006%, magnesium (Mg)=0.0001%, manganese (Mn)=0.0002%, and zinc (Zn)=0.0002%. A comprehensive recovery rate of nickel ore was 87%, and smelting costs of nickel sulfate were 11500 US dollars/ton base nickel.

Example 2 differed from Comparative Example 2 in that, in Comparative Example 2, high iron, low magnesium ore of 0.045-0.15 mm was not separated, and instead, all sediment ore entered an RKEF production line for producing ferronickel, resulting a high iron content of the ore and difficulty in producing high-grade ferronickel. In addition, a large amount of iron discharged from electric furnace slag (reduction) may take away part of nickel, resulting in a reduced recovery rate of nickel. During the sulfurating and blowing of the low-grade ferronickel, a large amount of iron needed to be discharged through slagging. An amount of nickel taken away by the slag was increased, and the recovery rate of nickel was reduced.

A method for producing battery-grade nickel sulfate by using laterite nickel ore provided in the present disclosure has been described in detail above. The principle and implementations of the present disclosure are described herein by using specific examples. The descriptions of the foregoing examples are merely used for helping understand the method and core ideas, including the best way of the present disclosure, and also enable any person skilled in the art to practice the present disclosure, including manufacturing and using any device or system, and implementing any combined method. It should be noted that a person of ordinary skill in the art may further make several improvements and modifications without departing from the principle of the present disclosure. These improvements and modifications also fall within the protection scope of the claims of the present disclosure. The protection scope of the present disclosure is subject to the claims, and may include other examples that those skilled in the art may conceive of. If these other examples have structural elements that are not different from the literal expression of the claims, or if they include equivalent structural elements that are not substantially different from the literal expression of the claims, these other examples should also be included in the scope of the claims.

The invention claimed is:

1. A method for producing battery-grade nickel sulfate by using laterite nickel ore, comprising the following steps:
   (1) sorting the laterite nickel ore to obtain lump ore and sediment ore; wherein the lump ore and the sediment ore are sorted according to a particle size, where a particle size of the lump ore is greater than 10 mm, and a particle size of the sediment ore is less than 10 mm
   (2) crushing the lump ore, and then performing heap leaching, to obtain a crude nickel sulfate solution A;
   (3) separating the sediment ore to obtain high chromium ore, low iron, high magnesium ore, and high iron, low magnesium ore, and drying, roasting, reducing, and sulfurating the low iron, high magnesium ore to obtain low nickel matte; wherein the high chromium ore comprises 30-40% by mass of chromium and 0.1-0.2% by mass of nickel; the low iron, high magnesium ore is mainly garnierite and comprises 1.5-2.1% by mass of nickel, 15-25% by mass of magnesium, 8-25% by mass of iron, and 35-50% by mass of silicon; and the high iron, low magnesium ore is mainly limonite and comprises 0.8-1.3% by mass of nickel, 30-50% by mass of iron, 0.1-10% by mass of magnesium, and 10-30% by mass of silicon;
   (4) blowing and performing water extraction on the low nickel matte, and then performing oxygen pressure leaching, to obtain a crude nickel sulfate solution B;
   (5) performing pressure leaching on the high iron, low magnesium ore to obtain a crude nickel sulfate solution C; and
   (6) performing extraction on the crude nickel sulfate solution A, the crude nickel sulfate solution B, and the crude nickel sulfate solution C, and then evaporating and crystallizing, to obtain battery-grade nickel sulfate; wherein, in the battery-grade nickel sulfate, a content of Mg<0.002 mass %, a content of Si<0.001 mass %, a content of magnetic substance<0.08 mass %, and a content of Co<0.002 mass %.

2. The method according to claim 1, wherein in step (1), the laterite nickel ore comprises the following components by mass percentage: 1.2-2% of Ni, 15-40% of Fe, 6-20% of Mg, 0.03-0.25% of Co, and 10-40% of Si.

3. The method according to claim 1, wherein in step (2), a specific operation of the heap leaching comprises: putting the crushed lump ore into a heap leaching pool, and then leaching nickel from the ore in a manner of spraying and soaking in sulfuric acid, to obtain the crude nickel sulfate solution; and in step (2), for the heap leaching, a temperature is 40-60° C., and a time is 30-50 days.

4. The method according to claim 1, wherein in step (3), for the roasting, a temperature is 800-1000° C., and a time is 1-3 h; and in step (3), for the reducing, a temperature is 1400-1600° C., and a time is 2-4 h.

5. The method according to claim 1, wherein in step (3), a reducing agent used for the reducing is at least one of coke, semi-coke, or anthracite.

6. The method according to claim 1, wherein in step (3), for the sulfurating, a temperature is 1100-1400° C., and a time is 0.5-3 h; in step (4), for the oxygen pressure leaching, a temperature is 100-250° C., and a pressure is 1-5 MPa; and in step (5), for the pressure leaching, a temperature is 170-260° C., and a pressure is 1-5 MPa.

7. The method according to claim 1, wherein in step (6), an acidic extractant is used in the extraction, $Fe^{3+}$, $Mn^{2+}$, $Co^{2+}$, $Mg^{2+}$, and $Ca^{2+}$ are extracted to obtain a nickel sulfate solution, and the acidic extractant is at least one of diisooctyl phosphate, mono 2-ethylhexyl 2-ethylhexyl phosphate, or di(2,4,4-trimethylpentyl).

8. The method according to claim 7, wherein in step (6), a specific operation of the extraction comprises: under conditions of a temperature of 50-80° C. and a pH value of 2-5, first extracting $Fe^{3+}$ and $Mn^{2+}$ by using diisooctyl phosphate, and then extracting $Co^{2+}$, $Mg^{2+}$, and $Ca^{2+}$ by using either or both of mono 2-ethylhexyl 2-ethylhexyl phosphate and di(2,4,4-trimethylpentyl), to obtain the nickel sulfate solution.

* * * * *